United States Patent
Butterfield (10) Patent No.: US 7,375,449 B2
(45) Date of Patent: May 20, 2008

(54) OPTIMIZED MODULAR ELECTRICAL MACHINE USING PERMANENT MAGNETS

(76) Inventor: Paul D. Butterfield, 1684 Kevin Dr., San Jose, CA (US) 95124

( * ) Notice: Subject to any disclaimer, the term of this patent is extended or adjusted under 35 U.S.C. 154(b) by 0 days.

(21) Appl. No.: 11/506,636

(22) Filed: Aug. 17, 2006

(65) Prior Publication Data

US 2008/0042515 A1    Feb. 21, 2008

(51) Int. Cl.
H02K 3/04 (2006.01)
(52) U.S. Cl. .................. 310/207; 310/268; 310/208
(58) Field of Classification Search ............. 310/268, 310/156.36, 207, 208, 184, 198
See application file for complete search history.

(56) References Cited

U.S. PATENT DOCUMENTS

| | | | |
|---|---|---|---|
| 447,921 A | | 3/1891 | Tesla |
| 469,917 A | * | 3/1892 | Eickemeyer ............ 310/208 |
| 534,953 A | | 2/1895 | Eickemeyer |
| 596,136 A | * | 12/1897 | Batchelder ............ 310/208 |
| 637,349 A | * | 11/1899 | Rosenqvist ............ 318/715 |
| 638,482 A | * | 12/1899 | Storer .................. 310/205 |
| 744,680 A | * | 11/1903 | Eickemeyer ........... 310/198 |
| 820,997 A | * | 5/1906 | Steinmetz ............. 310/207 |
| 1,471,851 A | * | 10/1923 | Kingsford ............. 310/207 |
| 1,743,818 A | * | 1/1930 | Hansen et al. ........ 310/198 |
| 1,782,263 A | * | 11/1930 | Gay .................. 323/215 |
| 1,815,832 A | * | 7/1931 | Chase ................ 310/198 |
| RE19,433 E | * | 1/1935 | Chase ................ 310/198 |
| 3,091,715 A | * | 5/1963 | Henry-Baudot ........ 310/268 |
| 3,193,715 A | | 7/1965 | Moressee et al. |
| 3,292,024 A | * | 12/1966 | Kober ................ 310/201 |
| 3,360,668 A | | 12/1967 | Faulhaber |
| 3,428,840 A | * | 2/1969 | Kober ................ 310/114 |
| 3,869,788 A | * | 3/1975 | Lazaroiu et al. ...... 29/597 |
| 4,228,384 A | | 10/1980 | Arnold, Jr. et al. |
| 4,331,896 A | | 5/1982 | Sedgewick |
| 4,358,693 A | * | 11/1982 | Palmer et al. ........ 310/46 |
| 4,371,801 A | * | 2/1983 | Richter .............. 310/156.36 |
| 4,500,806 A | * | 2/1985 | Kanayama et al. ..... 310/198 |
| 4,629,920 A | | 12/1986 | Hermann |
| 4,710,667 A | * | 12/1987 | Whiteley ............. 310/268 |
| 4,720,640 A | | 1/1988 | Anderson et al. |
| 4,833,356 A | * | 5/1989 | Bansal et al. ........ 310/207 |
| 5,021,698 A | | 6/1991 | Pullen et al. |
| 5,334,898 A | * | 8/1994 | Skybyk .............. 310/268 |

(Continued)

OTHER PUBLICATIONS

G.H. Jang and J.H. Chang, "Development of an Axial-Gap Spindle Motor for Computer Hard Disk Drives Using PCB Winding and Dual Air Gaps,".

(Continued)

Primary Examiner—Darren Schuberg
Assistant Examiner—Alex W Mok
(74) Attorney, Agent, or Firm—Richard Esty Peterson (57) ABSTRACT

An electrical machine having a magnet assembly with a magnet carrier ring with an even number of permanent magnets mounted in the carrier ring around a circular locus, and a conductor assembly with one or more conductor circuits wound in a double helix wave winding around a flat conductor support ring with the conductor circuits having uniformly curved conductor segments of involute or arcuate configuration wherein the magnet assembly and conductor assembly are contained in a housing with the magnet assembly rotating relative to the conductor assembly.

20 Claims, 8 Drawing Sheets

U.S. PATENT DOCUMENTS

| | | | |
|---|---|---|---|
| 5,349,259 A * | 9/1994 | Kaneko et al. | 310/261 |
| 5,760,502 A | 6/1998 | Van Loenen et al. | |
| 5,982,074 A | 11/1999 | Smith et al. | |
| 6,066,909 A | 5/2000 | Springer et al. | |
| 6,169,354 B1 | 1/2001 | Springer et al. | |
| 6,239,516 B1 | 5/2001 | Floresta et al. | |
| 6,411,002 B1 | 6/2002 | Smith et al. | |
| 6,424,069 B1 | 7/2002 | Pullen et al. | |
| 6,472,784 B2 * | 10/2002 | Miekka et al. | 310/68 R |
| 6,794,783 B2 * | 9/2004 | Tu et al. | 310/156.32 |
| 6,828,710 B1 | 12/2004 | Gabrys | |
| 2002/0149274 A1 | 10/2002 | Pullen et al. | |
| 2002/0153792 A1 * | 10/2002 | Isozaki et al. | 310/112 |
| 2003/0025417 A1 * | 2/2003 | Rose | 310/180 |
| 2003/0189388 A1 * | 10/2003 | Hashimoto et al. | 310/268 |
| 2004/0135465 A1 * | 7/2004 | Smith et al. | 310/268 |

OTHER PUBLICATIONS

IEEE Transactions on Magnetics, vol. 38, No. 5, Sep. 2002, p. 3297, PREM Hanyang University, Seoul, Korea.

Edited by Elixabeth Eitel, "Lorenz-Force Motors", MSD 101, Motion System Design, Mar. 2005, p. 36, motionsystemdesign.com.

"Introduction to SEMA Motor Technology," Kinetic Art & Technology, Jun. 2002, p. 1, Roy Kessinger, 9540 Hwy. 150, Greenville, IN 47124-0250.

"Axial Flux Permanent Magnet Brushless Machines", 2004, J.F. Gieras, R. Wang, M.J. Kamper. p. 28-39.

* cited by examiner

OPTIMIZED MODULAR ELECTRICAL MACHINE USING PERMANENT MAGNETS

BACKGROUND OF THE INVENTION

This invention relates to electrical machines using permanent magnets and in particular to axial field motor/generators that are robust and include design features for high efficiency in generating energy or developing torque. The optimized modular design allows the electrical machine to be versatile and incorporated in a variety of applications from transportation and power generation to machinery and robotics.

Axial field electrical machines differ from drum type machines by the ability to stack a series of similar modules along an axis to achieve multiple levels of power generation or torque development. In a typical module of an axial field electrical machine, a magnet assembly has two sub-assemblies that are spaced apart to create an axial flux gap in which a disk-like conductor assembly is centrally positioned. Movement of the conductor assembly relative to the magnet assembly induces a current in the conductor or conductors that in part make up the conductor assembly. Conversely, running a current through the conductors generates an electromagnetic field interacting with the magnetic field of the permanent magnets inducing a torque and a relative motion between the magnet assembly and the conductor assembly.

Therefore, in the description of the preferred embodiment, it is to be understood that the terms rotor or stator apply to the described embodiment and that either the magnet assembly or the conductor assembly may rotate. In certain applications, for example, in a wind turbine with counter rotating blades, both the magnet assembly and the conductor assembly may counter-rotate.

In optimizing the electrical machine of this invention, a novel counter-intuitive design and construction has been devised for the conductor assembly. Typically, the conductor assembly is constructed as a disk with radial conductors arranged to pass between a pair of multiple pole magnet subassemblies. In this configuration, the segments of the conductors are normal to the direction of motion of magnetic fields for maximized effect in instantaneous voltage or torque generation.

However, the traditional designs do not optimize other criteria that contribute to the overall efficiency and performance of an electrical machine having a high power-to-weight ratio. The flux or field strength of the permanent magnets is not only dependent on the strength of the magnets, but the width of the air gap between displaced poles. In general, the narrower the air gap, the greater the field strength for given magnets. In addition to providing clearance large enough for reliable mechanical movement of the magnet assembly relative to the conductor assembly, the composite circular or annular disk forming the conductor assembly must be sufficiently robust to absorb the torque whether the mode of the electrical machine is operationally a motor or a generator. In addition to the structural integrity, it is desirable to maximize the mass of the conductors exposed to the field between the magnet poles. In addition to maximizing the power or torque, the resistance is minimized, thereby reducing the generated thermal energy during operation.

In high power, high torque electrical machines of the type described, high energy permanent magnets are preferred. Low-cost, standard NdFeB "rare earth" magnets are temperature sensitive and are subject to degradation even at the moderate temperatures generated by the conductor windings. Design strategies that increase the conductor mass to reduce the resistance and enlarge the heat sink effect of conductor circuits can be coupled with magnet cooling strategies for greatly improved performance. By confining the conductors of the conductor assembly to a flat annular ring in the path of the field, the effective length of the conductors for power or torque generation is maximized while the ineffective segments extraneous to the field that nevertheless generate heat are minimized.

The conductor assembly of the invented electrical machine is optimized by a planar, double-helix annular conductor path with conductor segments that are involute or arc shaped. Optimally, the midsection of each involute or arcuate conductor segment is angled approximately 45° from the radial. The involute shaped conductor segments allow adjacent conductor segments to be more densely packed with uniform minimal space between adjacent segments. The involute configuration allows for equidistant spaced curved lines on a ring defined by concentric diameters and a base pitch circle. The arc shaped segments closely approximate the involute conductor configuration and may have fabrication advantages with only minor effect on density and the uniformity of the insulating space between segments. The arc shaped segments are preferred when the number of magnets in a circular series exceeds ten. Additionally, with the slight crescent shape of the insulator filled space between conductor segments, greater strength at the peak stresspoint may be obtained. Alternately, small cooling channels may be provided between the conductor segments.

Although the novel conductor assembly can be utilized with a rotary field assembly that includes a stationary field winding to generate the electromagnetic fields in a stator for operation as a variable speed motor or variable voltage generator, it is to be understood that the preferred field assembly is a magnet assembly that includes permanent magnets as the sole or primary means of generating the magnet flux that co-acts with the conductor assembly.

The magnet assembly preferably includes at least two sub-assemblies, each having a retainer structure for holding a series of permanent magnets around a circular locus with a common axis to the discoidal conductor assembly. The series of permanent magnets in each sub-assembly radially align and the two sets of opposed magnets align with the flat, double helix flat ring of the conductor or conductors when the conductor assembly is positioned between the two sub-assemblies of the magnet assembly.

The permanent magnets in the magnet set may be square, circular or other shape that is preferably off-the-shelf to minimize material costs. The arrangement of square magnets in the retainer structure may be corner to corner in a diamond pattern or side by side in a band. The retainer structure is fabricated of a magnetically inert substance such as aluminum and includes a high strength perimeter band when the magnet assembly is configured as a rotor.

When the magnet assembly is configured as a rotor, the electrical machine is advantageously constructed as a versatile brushless motor-generator. The modules may be combined on a common axis to compound the generated power or torque. These and other features are described in greater detail in the sections that follow.

SUMMARY OF THE INVENTION

The electrical machine of this invention combines an array of high energy permanent magnets and a novel conductor configuration to form a highly efficient axial flux device. The optimized axial flux device has a variety of applications as a motor, a generator or a combined motor-generator that is robust and versatile. The disk-shaped components are designed to be combined into modules that can be stacked for increased power density allowing the use of identical parts for machines of incrementally increasing capacity. The axial field electrical machine of this invention incorporates basic features that can be incorporated into a variety of different implementations. For example, although the preferred embodiment of the electrical machine describes a magnet assembly rotor and a conductor assembly stator, it is to be understood that the unique features can equally be applied to a device having a magnet assembly stator and a conductor assembly rotor or to a device where both the magnet assembly and the conductor assembly are rotors in a relatively stationary housing structure.

In the invented electrical machine, the magnet assembly has at least one and preferably two ring-shaped magnet sub-assemblies positioned on the side or sides of a ring-shaped conductor assembly. In the preferred embodiment, to take advantage of a magnet rotor assembly with back-to-back magnet placements, the electrical machine has a double center magnet sub-assembly with a conductor assembly having two conductor sub-assemblies on each side of the center magnet sub-assembly and two end magnet sub-assemblies. The preferred hollow magnet array rotors and annular conductor stators provide an internal chamber and a path for fluid cooling flow as well as the potential for using the center space for hollow shaft applications in robotics, wind and hydro turbines or machine tool spindles.

The magnet array of the magnet sub-assemblies comprises a symmetrical arrangement of high energy, generally thin flat magnets on a common circular locus radially displaced from a central axis. The topology of the array can be varied by the number of discrete magnets, their size and configuration, and their polar orientations. In preferred configurations, to generate or receive power in an alternating current, the magnets are oriented with alternately facing poles for adjacent magnets in the circular magnet array in each sub-assembly. The magnets in the opposed sub-assemblies of each module are aligned with facing opposite poles on opposite sides of a pre-defined air gap. The air gap is sized to mechanically accommodate conductor sub-assemblies in the form of flat toroids.

The toroidal conductor assembly has a novel conductor geometry with a continuous arcuate or preferably involute (gear tooth) pattern on each side of each conductor sub-assembly. In a preferred embodiment, the pattern is formed by a wire winding on a grooved and perforated or notched toroidal form. Alternately, the conductor pattern may be formed by a plated or deposited conductive material in a grooved substrate that is finished to preserve insulating boundaries between conductor segments. The involute and/or arcuate geometry of conductor segments on the form or substrate provides for a maximized density of conductor material in the magnetic field formed by opposed magnets. When using a multi-strand Litz wire, the density can be increased by press forming the Litz wire into the grooves and compressing the form while heating the wire to impregnate the wire with a meltable polymer material that forms the form.

The number of windings is preferably coordinated with the number of poles in the magnet array on the magnet sub-assemblies. Arrangements with eight, ten, twelve, fourteen or sixteen magnets in a symmetrical circular array operate well for high torque mid-size machines. The arrangement of conductor segments is such that, when the middle of a conductor segment of a toroidal winding on one side of the form is aligned with the center of one set of opposed magnets, the middle of the continuing conductor segment on the opposite side of the form is aligned with the center of the next adjacent set of opposed magnets. In this specification, the terms "conductor" and "winding" refer to printed, deposited, cut, milled or otherwise formed conductors as well as the wrapped, multi-strand wire conductor and compressed winding of the preferred embodiment. By using adjacent sets or groupings of windings, a multiphase electrical machine is created with the conductor material being maximized for the flat toroidal conductor sub-assemblies. The resulting sub-assemblies can be further optimized for structural integrity with a minimized insulator boundary between adjacent conductor segments. Generally, two and preferably three or more energizing circuits are preferred for smooth operation.

In fabricating the conductor assemblies, a flat disk-like structure that can absorb the torque from a perimeter mounting or a center mounting is required. In this manner, the uniform windings may contribute to the integrity of the integrated structure. This and other features will become apparent from a consideration of the detailed description of the preferred embodiments.

BRIEF DESCRIPTION OF THE DRAWINGS

FIG. 5-A is a diagrammatic illustration of the continuous arc curve for conductor segments in the conductor assembly in the electrical machine of FIG. 1.

FIG. 5-B is a diagrammatic illustration of the alternate continuous involute curve for conductor segments in the conductor assembly in the electrical machine of FIG. 1.

FIG. 6-A is a schematic illustration of a circular magnet arrangement on a ring segment of a magnet assembly with resultant wave form for the electrical machine of FIG. 1.

FIG. 6-B is a schematic illustration of an alternate square magnet arrangement on a ring segment of a magnet assembly with resultant wave form for the electrical machine of FIG. 1.

FIG. 6-C is a schematic illustration of a second alternate square magnet arrangement on a ring segment of a magnet assembly with resulting wave form for the electrical machine of FIG. 1.

FIG. 6-D is a perspective of an alternate sector shaped magnet for use in a magnet arrangement on a ring segment of a magnet assembly in the electrical machine of FIG. 1.

DETAILED DESCRIPTION OF THE PREFERRED EMBODIMENTS

Figure 1:
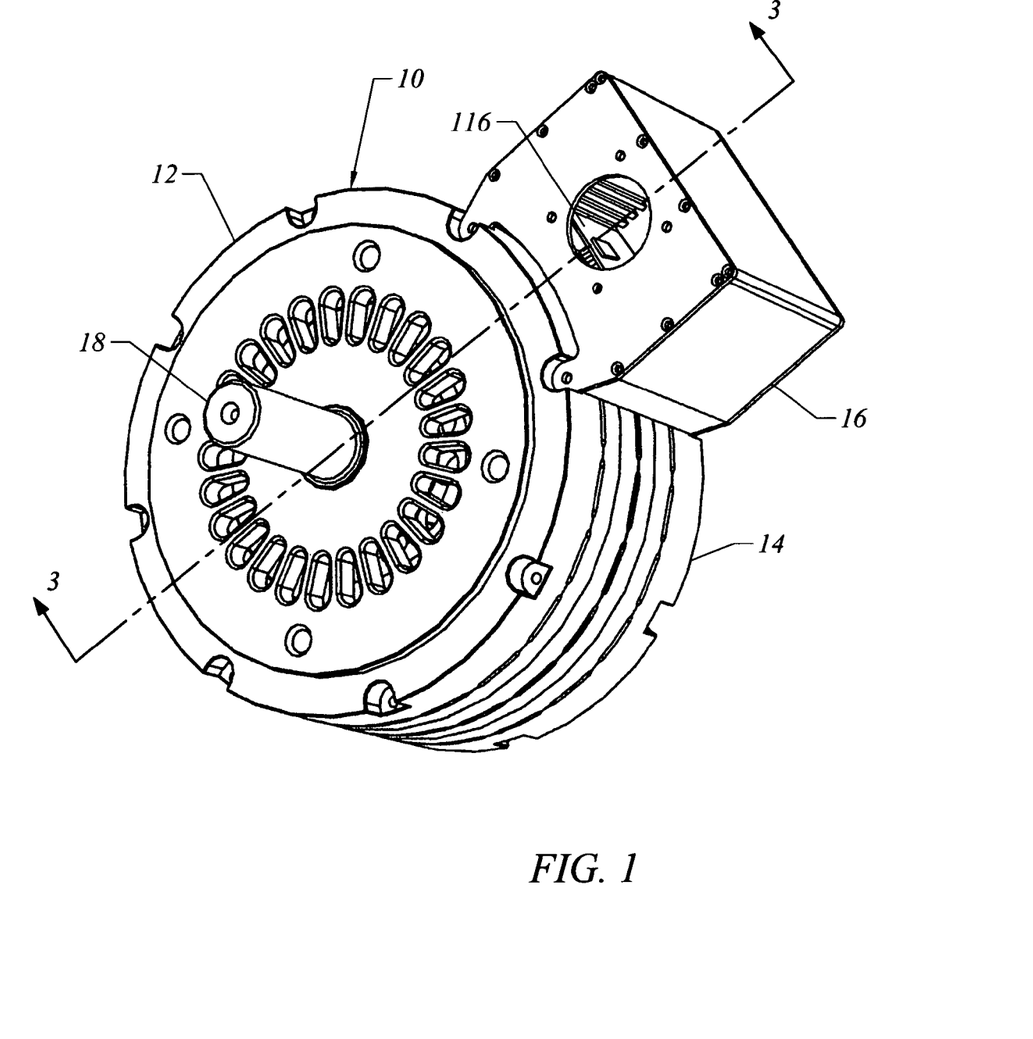
FIG. 1 is a perspective view of a preferred embodiment of the electrical machine of this invention.

A preferred embodiment of the electrical machine of this invention is shown in FIG. 1, and is designated generally by the reference numeral 10. The electrical machine 10 has an outer housing 12 with a main body 14 and a side mounted electronics compartment 16. On the central axis of the electrical machine 10 is a projecting rotor shaft 18. In the embodiment of FIG. 1, the electrical machine 10 is operational as a brushless motor or generator and is suitable as a motor-generator for electric vehicles.

Figure 2:
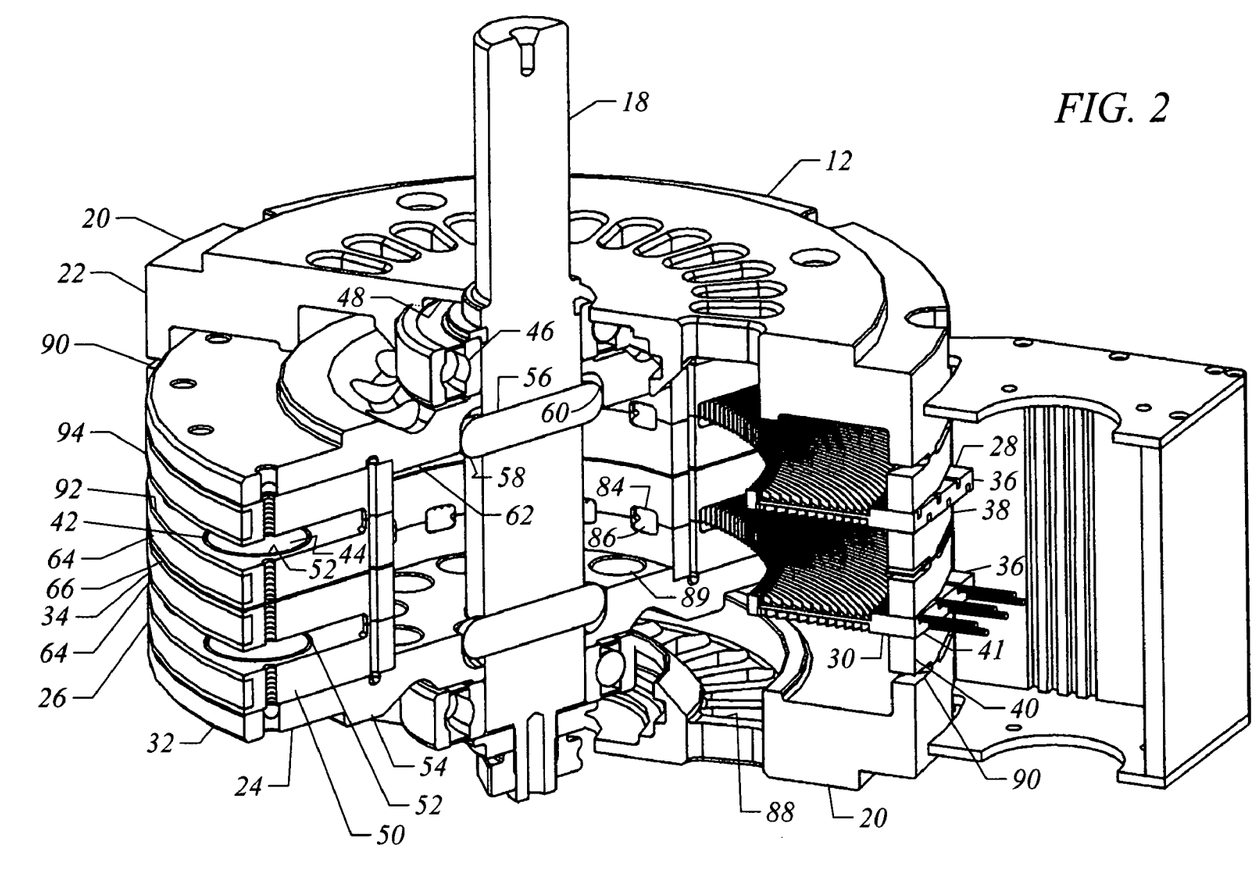
FIG. 2 is a perspective view in a multiple plane cross section of the electrical machine of FIG. 1.

Referring in addition to the compound, cross-sectional perspective of FIG. 2, the outer housing 12 is formed with two end plates 20 with peripheral side walls 22 that encase a rotor 24 with magnet assembly 26 and a stator 28 with a conductor assembly 30. It is to be understood that the preferred electrical machine 10 of this invention is an axial flux machine that may have multiple modules to vary the power with similar and preferably identical components. In the embodiment of FIG. 2, the electrical machine has a magnet assembly 26 with end magnet sub-assemblies 32 and central magnet sub-assemblies 34 to cooperate with two conductor sub-assemblies 36.

Since the magnet sub-assemblies 32 at each end differ from the central magnet sub-assemblies 34, a system having two conductor sub-assemblies 36 was selected as representative of the modular system of this invention. Where a single conductor assembly is utilized, the central magnet sub-assemblies are omitted, leaving two end magnet sub-assemblies 32 on each side of a single conductor assembly 30. Alternately, as known in the art, a unit may be constructed with a single magnet sub-assembly with a reduction in efficiency and performance.

When the electrical machine 10 includes one or more central magnet sub-assemblies as shown in FIG. 2, the housing 12 includes one or more peripheral spacer rings 38 between adjacent conductor sub-assemblies 36. In FIG. 2, the conductor sub-assemblies 36 have conductor carrier rings 40 with supporting perimeters 41 that are sandwiched between the peripheral side wall 22 of an end plate 20 and the single housing spacer ring 38. It is to be understood that, with added modules, the supporting perimeters 41 of the added conductor sub-assemblies 30 will be sandwiched between added housing spacer rings 38 on both sides of the conductor sub-assembly 36.

The peripheral side wall 22 of the housing end plates 20 and the added spacer rings 38 are sized to respectively accommodate the thickness of the end magnet sub-assemblies 32 and the central magnet sub-assembly 34. The central magnet sub-assembly 34 is a double or compound magnet sub-assembly with two sets 42 of back-to-back permanent magnets 44. The rotor 24 includes the projecting rotor shaft 18, bearings 46 that cooperate with bearing blocks 48 internally mounted in the opposed end plates 20 of the housing and the magnet assembly 26.

In the preferred embodiment of FIG. 2, the two end magnet sub-assemblies 32 have a magnet carrier ring 50 fabricated from a non-magnetic material, such as aluminum, with uniformly spaced cut-outs or pockets 52 for the uniformly-spaced, high-strength circular magnets 44. The magnet carrier ring 50 is coupled to a backing disk 54 fabricated from a magnetizable material, such as steel. The magnetizable backing disk 54 magnetically retains the magnets in the circular cut-outs and provides a return path for the magnetic flux of adjacent magnets 44 of opposite polarity in the magnet set 42. The steel backing disks 54 inhibit magnetic field leakage and provide a high-strength means of connecting the magnet assembly 26 to the rotor shaft 18, using cross pins 56 through the shaft 18. The projecting ends 58 of the cross pins 56 seat in central recesses 60 in a hub portion 62 of the steel backing disks 54 and lock the magnet assembly 26 to the rotor shaft 18. The central magnet sub-assembly 34 is constructed with two magnet carrier rings 64, which are of similar configuration to the carrier rings 50 of the end magnet sub-assemblies 32. The carrier rings 64 have circular pockets 52 for insertion of the circular magnets 44. The two magnet carrier rings 64 are separated by a thin, preferably magnetizable ring 66 without cut-outs to aid in assembly and disassembly of the rotor with its powerful permanent magnets arranged with opposite back-to-back poles. The strong attraction of the back-to-back magnets maintains the structural integrity of the compound or double central magnet sub-assemblies 34. The end magnet sub-assemblies 32 and the central magnet sub-assembly 34 are interconnected by pin 68 in FIG. 3, to rotate as a unit. Holes 70 are shown for an insertion of setscrews 70 to balance individual rings 50. The use of magnetic forces in the magnet sub-assemblies 32 and 34 allows the magnets to be retained without glue and facilitates disassembly for servicing and repair.

Figure 3:
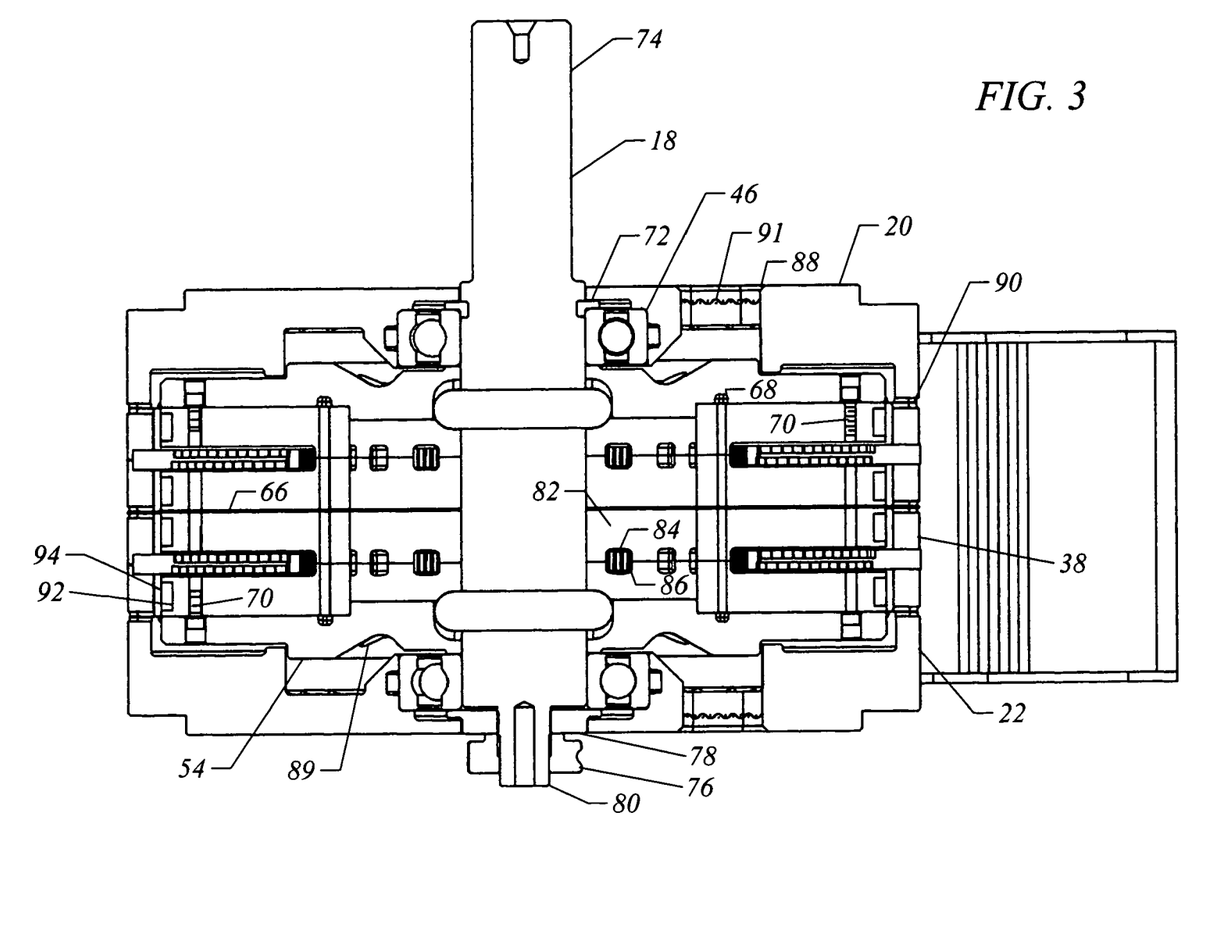
FIG. 3 is an elevational cross-sectional view taken on the lines 3-3 in FIG. 1.

As shown with reference to FIGS. 2 and 3, the bearings 46 are seated in blocks 48 that are a part of the end plates 20, and are fixed longitudinally on the rotor shaft 18 by a clip 72 at the projecting end 74 and a nut 76 and washer 78 at the opposite end 80. The magnet sub-assemblies 32 and 34 are thereby clamped together into a unitary assembly 26 that rotates with the shaft 18. The projecting end 74 of the shaft 18 is prepared as required by the application and may include splines or a keyway (not shown), or be hollow.

When assembled, the magnet carrier rings 50 are configured to provide an annular interior chamber 82. The carrier rings 50 have slots 84 that, when coupled to the facing ring, form a series of bi-directional contoured air scoops 86 that are configured and positioned to direct a centrifugal flow of air from the chamber 82 over the magnets 44 contained in the rings 50. Air enters the chamber 82 though ports 88 in the end plates 20 of the outer housing 12 and ports 89 in the backing disk 54 and exits through peripheral contoured slots 90 in the side walls 22 of the end plates 20 and spacer ring 38 designed as diffusers to assist in the outflow of the air. Magnetized screens 91 at the intake ports 88 capture any magnetic grit before entering the interior at the housing 12.

Although the conductors generate the heat, the magnets are more sensitive to the generated heat and the air flow is therefore directed across the surfaces of the magnets during rotation of the rotor 24. To minimize the diameter and maintain the structural integrity of the magnet carrier rings 50 during high speed rotation, the carrier rings 50 have a perimeter groove 92 in which is seated a high strength band 94. The high strength retention band 94 can be made of a variety of materials, such as plastic, resin filled fiber glass, carbon fiber, banding string, metal wire or a high strength metal ring. A magnetic retention band can serve to reduce leakage flux from moving magnets and permit the use of a conductive housing close to the rotor, minimizing heating due to induced eddy currents while maximizing the power density of the machines.

Figure 4:
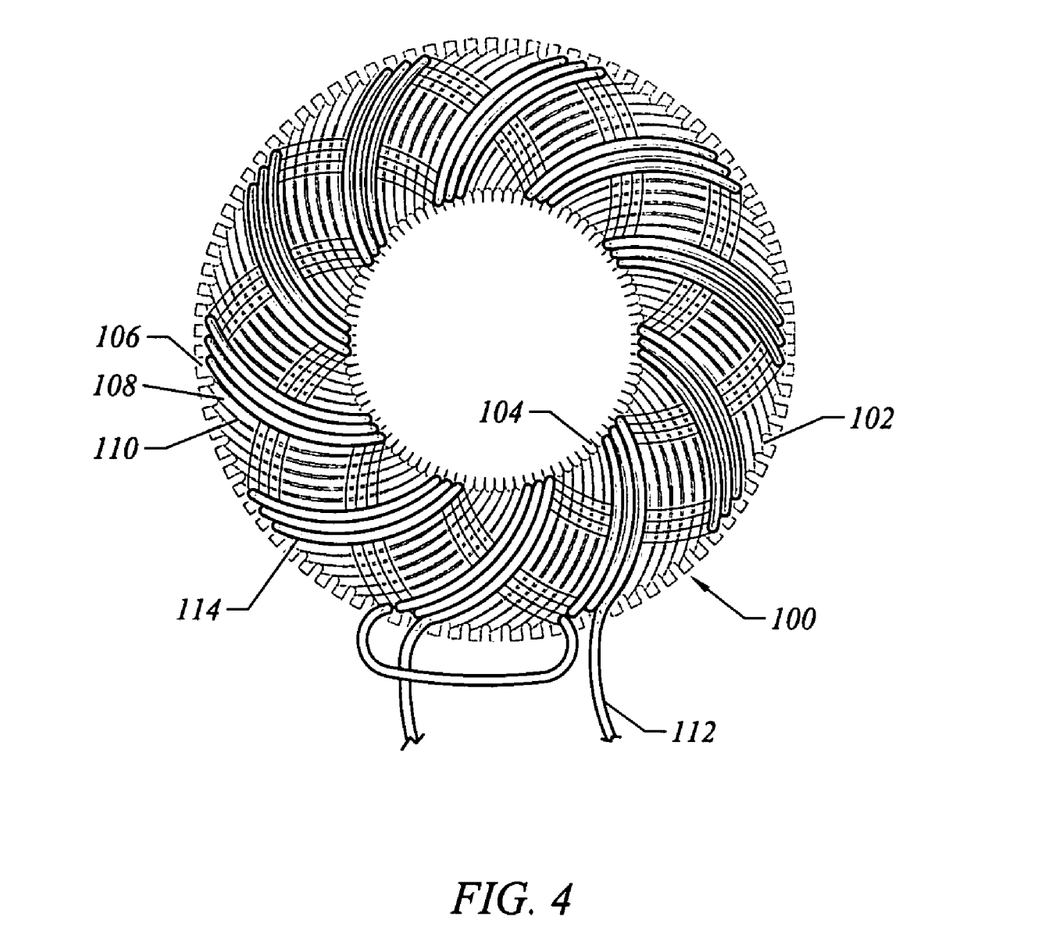
FIG. 4 is a plan view of a typical partial wire winding on a conductor form for the conductor assembly in the electrical machine of FIG. 1.

In FIG. 4, there is shown a partially formed conductor sub-assembly 100. The sub-assembly 100 has a non-conductive annular form 102 with a series of uniformly spaced inner notches 104 and an equal number of uniformly spaced outer notches 106. The inner notches 104 connect to outer notches 106 by arcuate grooves 108 of uniform width. The arcuate grooves 108 are more accurately configured as segments of an involute. The insulating ridges or barriers 110 between adjacent grooves 108 are advantageously also nearly uniform and of minimum thickness. In the embodiment of FIG. 4, one wire circuit 112, comprising a wrapped multi-filament wire, is press-fit into the grooves 108 and into the notches as it is helically wound around the form 102 in a three-wire wide, double helix pattern. In this manner, the conductor material in the path of the rotating magnets, and hence the generated magnetic fields, can be maximized. A discoid-shaped wave winding is thereby generated with involute wire segments 114 in a single front and back winding wrap without inflection points spanning adjacent magnets 44 having opposite poles.

The number and spacing of the notches 104, 106 and grooves 108 on the front and backside of the form 102 are such that the circuit in FIG. 4 is designed for a 10-pole system, i.e., a carrier ring having ten magnets as suggested by the crossing points of the group of three front and back segments 114 of the wire circuit. In the embodiment of FIG. 4, two additional wire circuits (not shown), each three wire wraps wide as in the wire circuit 112 shown, are helically wound on the form 102. For larger electrical machines, the wire circuits may include more poles of even number and combine four or more adjacent wires in each circuit wrap. Each wire circuit generates an averaged pulse as the grouped front and back wire segments 114 pass through the flux field formed by the opposed magnets with opposite facing poles. Conversely, when operated as a motor, an appropriately timed pulse of electricity, as the magnets move through the flux fields, produces a torque on the rotor and rotates the shaft. Three-wire circuits are preferred, particularly when the electrical machine 10 is operated as a motor to enable continuous operation and avoid cogging. The three circuits are uniformly 120° out of phase and may be electronically processed by the electronic controller 116 in the electronics compartment 16 of FIG. 1.

The result of the toroidal wave winding is to pass the middle of the wire segments 114 across the middle of the flux fields, i.e., the circular locus of the centers of the magnets at approximately 45 to 60 degrees, as opposed to the 90 degrees of the typical radial winding. The preferred 45° geometry makes a flat winding with no end turn bulge with the majority of the winding passing through the flux fields of the magnets. With the increase in conductor costs and decrease in magnet costs, the magnets can be slightly oversized, such that the windings fully pass through the developed magnet flux field. In this manner, only the small cross-over portion in the notches that cross from front to back is extraneous.

Figure 5A:
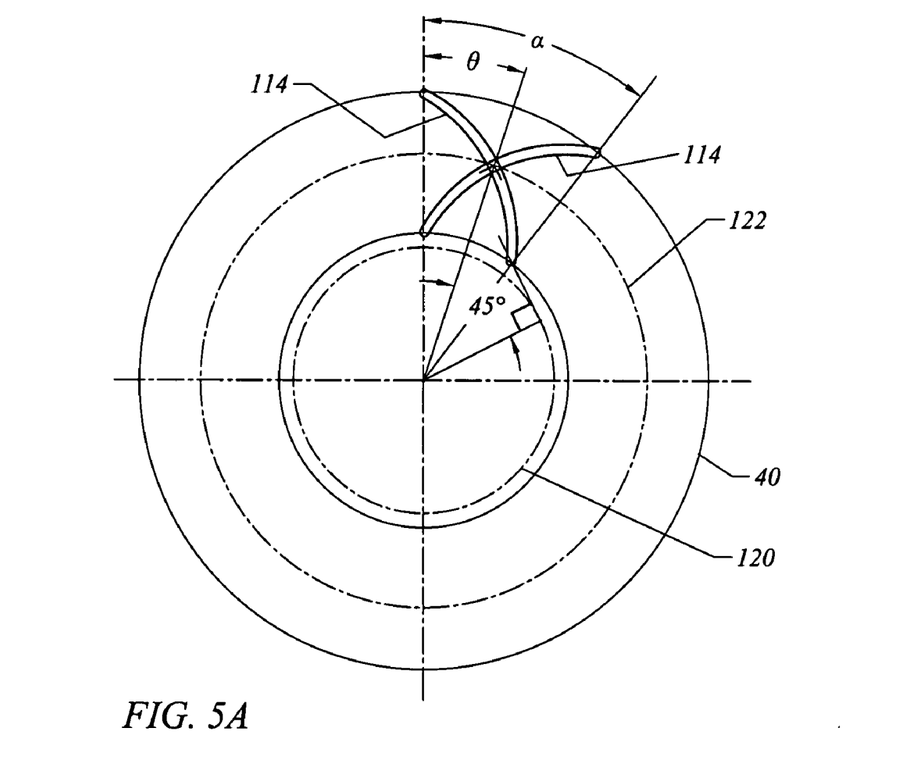
Figure 5B:
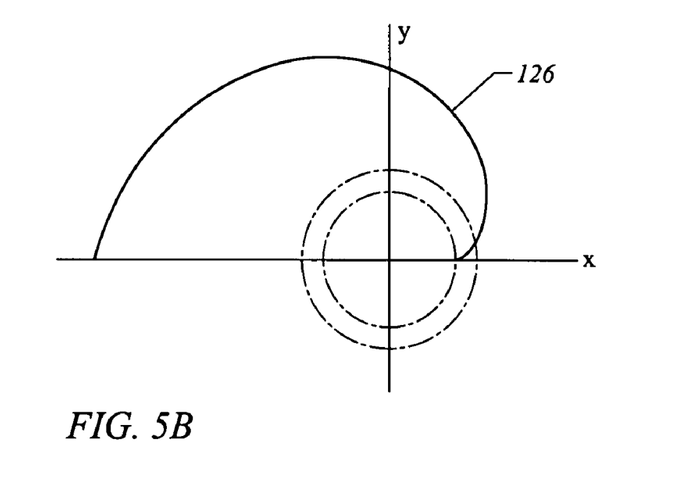
Figure 6A:
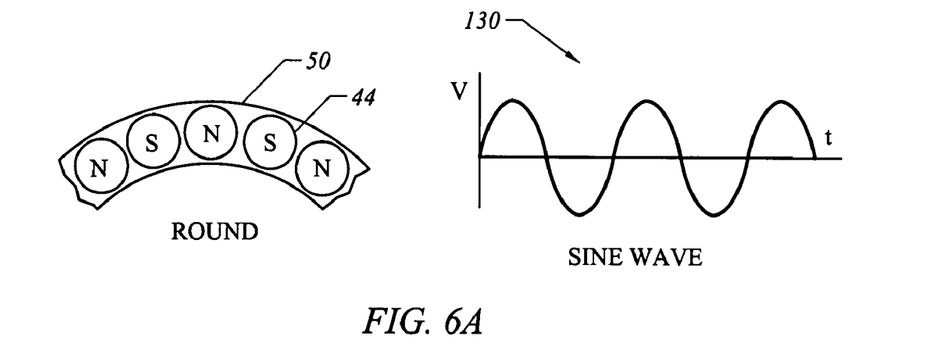
Figure 6B:
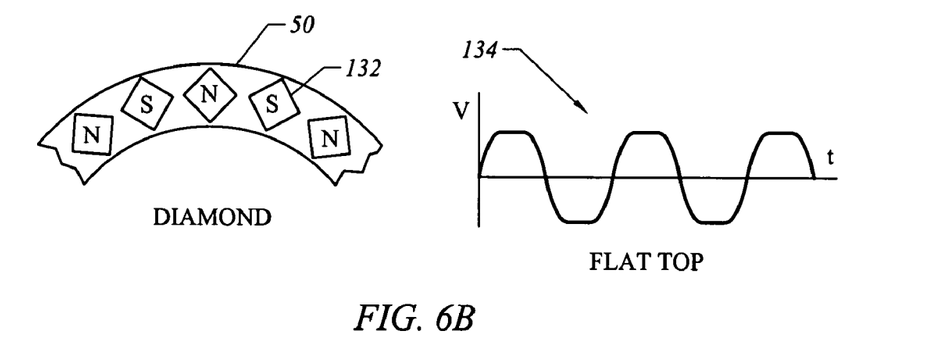
Figure 6C:
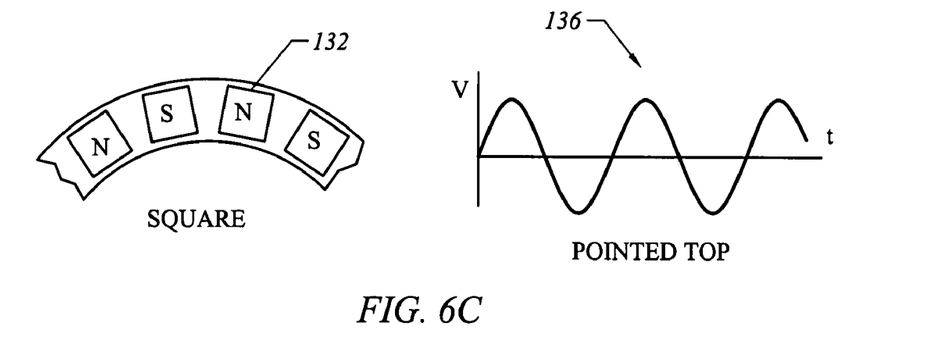
Figure 6D:
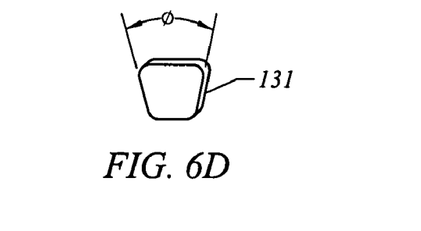

In the diagrammatic illustrations of FIGS. 5-A and 5-B, the preferred wrap curvatures are disclosed. In FIG. 5-A, the arcuate curvature of a wire segment 114 is taken from a base circle 120 inside the conductor carrier ring 40. The angle X is determined by the number of magnets, an even number for alternating poles, divided into 360° to determine the angular allotment for a single wire segment 114. On selection of a magnet pitch circle 122, typically at a radius equal to or less than the circular locus of magnet centers, the radius of the arc of a wire segment can be determined by the triangulation method shown, using a right isosceles triangle.

Similarly, with reference to FIG. 5-B, a preferred curvature can be selected from an involute curve 126 generated from a base circle with a radius "a" using the parametric equations:

$$X = a\ [\cos{(t)} + t \sin{(t)}]$$

$$y = a\ [\sin{(t)} - t \cos{(t)}]$$

The front and back wire segments 114 cross at 90° at a magnet pitch circle 122 of radius, equal to the circular locus of magnetic centers as a result of the involute curvatures. In both systems, the conductor segments exposed to the magnetic field have a continuous curvature without inflection.

As a result, when compared with a radial of the rotation axis, the curved conductor segment on each side of the support form has a midpoint tangent that is not coincident with the radial but that forms an angle in the range of 30° to 80° from the radial of the rotation axis that is normal to the tangent. The angle difference depends in substantial part on the number and configuration of the magnets.

Referring to FIGS. 6-A, 6-B and 6-C, the shape of the magnets retained in the flat discord magnet carrier rings affects the shape of the generated pulse during operation of the electrical machine 10 as a generator. In FIG. 6-A, the use of circular disk magnets 44 in the magnet carrier ring 50, as in the FIG. 1 embodiment, produces a wave form 130 that is close to a sine wave. When flat rectangular magnets 132 are oriented in a diamond configuration in the carrier ring 50, as shown in FIG. 6-B, the wave form 134 is truncated with a flat top. When flat rectangular magnets 132 are oriented in a band configuration in the carrier ring 50, the wave form 136 is triangular and pointed as shown in FIG. 6-C. Use of a sector shaped magnets 131, as shown in FIG. 6-D, can maximize the flux density but are not as cost effective as standard shaped magnets.

The use of magnets having conventional shapes and standard sizes greatly reduces the cost of the permanent magnets. Use of a single magnet configuration having a standard size, shape and thickness for a particular machine also reduces costs. In this manner, as well as ease of assembly and structural integrity, the central magnet sub-assemblies 34 use back-to-back magnets instead of magnets with double the thickness of conventional magnets.

It is to be understood that there are numerous variable parameters in the design of a modular electrical machine of the type disclosed. The application for the machine is a primary consideration and dictates many of the specifications, including the basic determination as to whether the conductor assembly is a stator or a rotor. While the design of the toroidal conductor assembly provides for a comparatively light-weight, high-speed applications, it is preferred that the conductor assembly comprise the stator with the magnet assembly operating as the rotor. In this manner, the electrical machine advantageously operates as a brushless motor-generator. And, additionally, the conductor sub-assemblies are supported at their outer perimeters in the housing structure with the conductor terminals oriented at the electronics compartment. The perimeter support of the conductor sub-assemblies 36, as shown in FIGS. 2 and 3, allows the thickness of the sub-assemblies to be minimized, yet retain a robustness to resist deformation under the torque generated, whether operating as a generator or motor.

To achieve the structural integrity required, different techniques are employed depending on the materials used in the fabrication. For example, for the partial sub-assembly 100 of FIG. 4, the preferred multi-stranded and served Litz conductor not only eliminates eddy currents in the conductor, but can be easily pressed into the uniform arcuate grooves 108 in the annular form 102 between the insulating ridges 110.

The windings can be further compressed to deform to the shape of the grooves, impregnated with a high temperature resin when joined to a perimeter support ring and surfaced with a non-conductive fiber cloth in a form press to protect the windings and leads and form a unitary structure of high structural integrity. Impregnating the conductor, for example a Litz wire wrapping, can be accomplished in the form press by heating the wire by electrical current to melt the non-conductive form into the multi-strand wire, thereby improving the structural integrity of the assembly.

For other extreme applications, ceramic or other high temperature materials may be used as a grooved winding former for wrapped or deposited conductors. For low-speed applications, a grooved former made of magnetic material, such as powdered iron, can be used to reduce the thickness of the optimum magnets. The common feature of the toroidal wave winding minimizes the effect of local variances in magnetic field strength or shape on output wave form or torque ripple. The wave form geometry for multi-strand or monofilament conductor windings eliminates end turn bulge and results in a smooth transition from one side of the form to the other.

Figure 7:
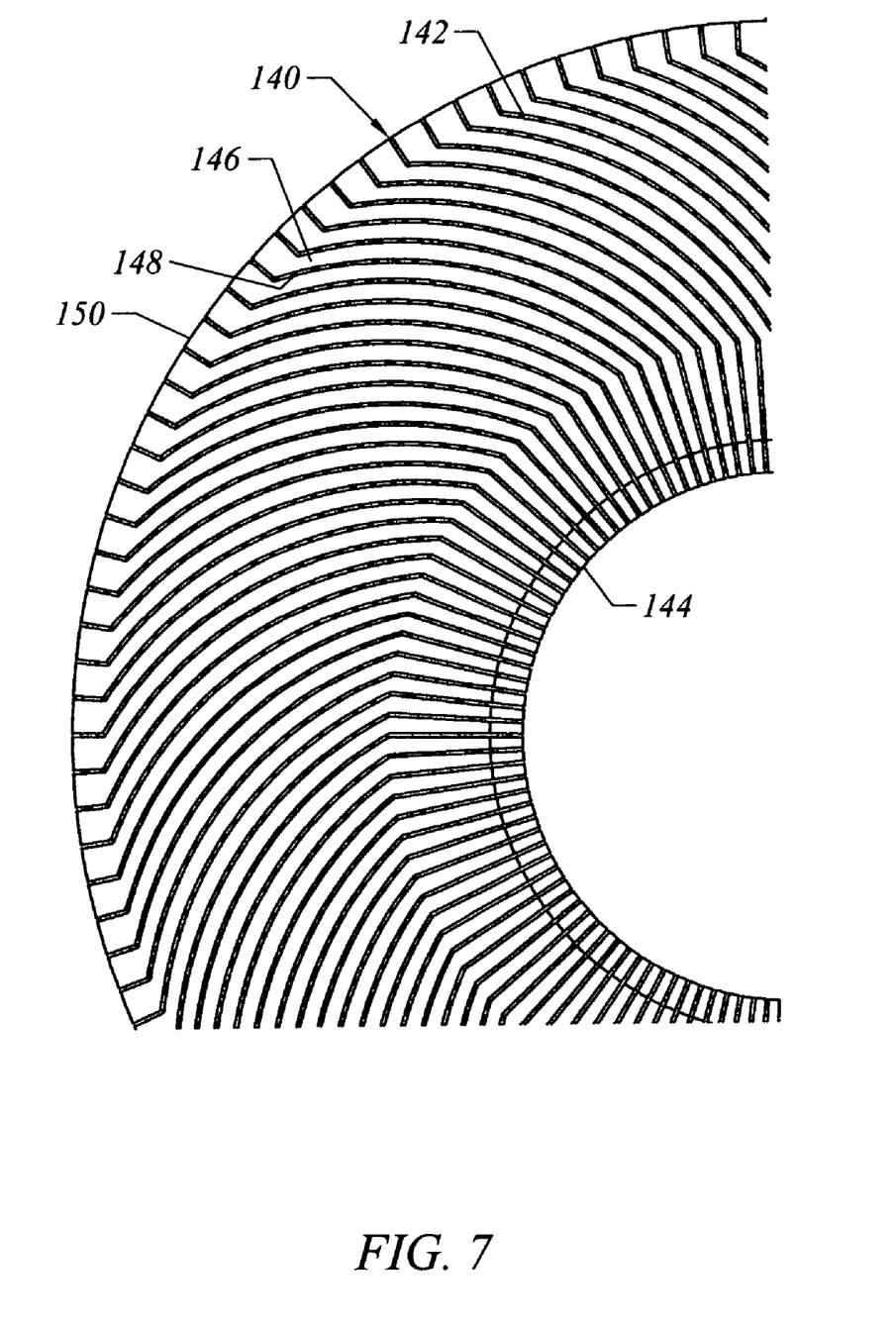
FIG. 7 is a plan view of a partial conductor ring for an alternate conductor assembly where the electrical machine has a conductor assembly rotor.

When the conductor assembly is operated as the rotor, accommodation for a conventional brush unit can be provided. As shown in the partial view of the conductor assembly 140 in FIG. 7, the curved conductor segments 142 that pass through the flux field have inner radial extension segments 144 for contact by a conventional brush assembly (not shown). The frontside conductors 146 and crossing backside conductors 148 are spaced apart, except where joined at the perimeter tabs 150 and at the inner brush segments 144. The assembly 140 may be milled from a disk of conductor material or deposited on a form. A non-conductive resin fill for the spaces between adjacent and frontside and backside conductors will provide structural integrity as a disk or ring and allow the conductor assembly to rotate as a unit by its inner or outer periphery depending on the desired application.

It is to be understood that the basic electrical machine disclosed can be modified as is known in the art by added features that improve the performance for reasonable added costs. For example, the magnet sub-assemblies for the end modules may include magnets in a Halbach array to re-focus the magnetic field, and the magnet assembly may include field windings for improved operation of the electrical machine as a motor. The conductor assembly may be doubled up with two assemblies formed together as a unitary structure. These techniques may be added to the basic structure described when appropriate for a particular application.

In the preferred configuration, as a brushless motor-generator, the electrical machine of this invention has alternate embodiments in which the novel conductor assembly is incorporated. As examples, but by no means exhaustive examples, the embodiments of FIGS. 8-11 illustrate some of the suggested configurations.

Figure 8:
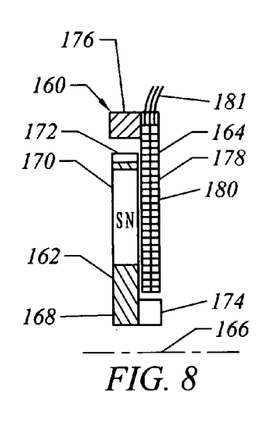
FIG. 8 is a schematic partial cross-sectional illustration of an alternate embodiment of an electrical machine with a single magnet carrier using the novel conductor assembly.

In FIG. 8, the schematic, partial, cross-sectional illustration of the electrical machine 160 depicts a simple alternate embodiment showing a magnet assembly 162 and a conductor assembly 164 without a housing or support structure being shown. The magnet assembly 162 rotates about the axis 166 and includes an annular discoid magnet carrier 168 with a series of uniformly spaced, even number of permanent magnets 170, having an outer retainer band 172 and an inner connector ring 174. The magnet carrier 168 is positioned next to the conductor assembly 164 that has a stator support ring 176 that supports a form wound conductor ring 178 with a double-helix wave winding 180 of the configuration previously described. The conductor windings 180 have two or more terminals 181, depending on the number of circuits desired for connection to a controller (not shown) or other suitable input or output. The electrical machine 160 of FIG. 8 is designed for light weight systems of low inertia that are relatively inexpensive.

Figure 9:
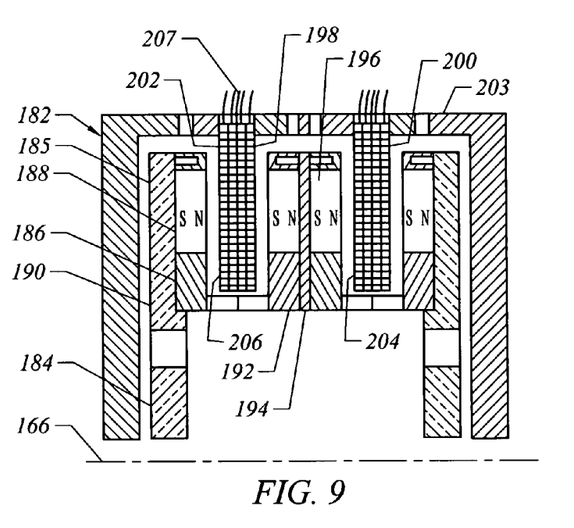
FIG. 9 is a schematic partial cross-sectional illustration of an alternate embodiment of an electrical machine with a conductor assembly having a conductor sub-assembly with back-to-back wound conductor rings.

In the electrical machine 182, schematically illustrated in FIG. 9, the configuration of the magnet assembly 184 is similar to that described with reference to the FIG. 1 embodiment with magnet sub-assemblies 185 having outer magnet carrier rings 186 with spaced permanent magnets 188 coupled to backing disks 190 that serve as a flux return member. The sub-assemblies 185 also include central magnet carrier rings 192 that are separated by a thin spacer ring 194 to separate back-to-back permanent magnets 196 as previously described.

The conductor assembly 198 has conductor sub-assemblies 200, each with a coupled pair of back-to-back form wound conductor rings 202 mounted at their outer periphery in housing 203. The form wound conductor rings 202 are each wound with double helix wave windings 204 as previously described and are bonded or fabricated together to form a unitary member 206 of high structural integrity. Again, the wave windings 204 have a configuration as previously described and include one or more circuits with terminals 207. The electrical machine 182 of FIG. 9 is designed for higher inertia applications, demanding high efficiency as in transportation and energy production.

Figure 10:
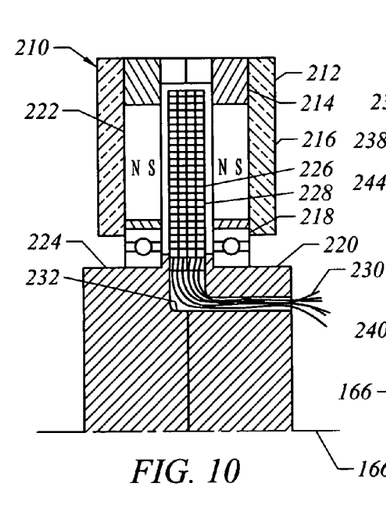
FIG. 10 is a schematic partial cross-sectional illustration of an alternate embodiment of an electrical machine with a conductor assembly on a stationary hub with a magnet assembly on an outside rotor.

In the electrical machine 210 of FIG. 10, magnet assembly 212 has bracketing magnet carrier rings 214 coupled to backing disks 216 and bearings 218 to revolve around a stationary hub 220. The magnet carrier rings 214 contain a series of magnets 222 located on each side of a stationary conductor assembly 224. The conductor assembly 224 has back-to-back form wound conductor rings 226 with double helix wave windings 228 having the configuration as previously described. The conductor rings 226 are bonded together to form a unitary member of high structural integrity. The conductor terminals 230 are fed through a passage 232 in the hub for connection to a controller or other input or output.

Figure 11:
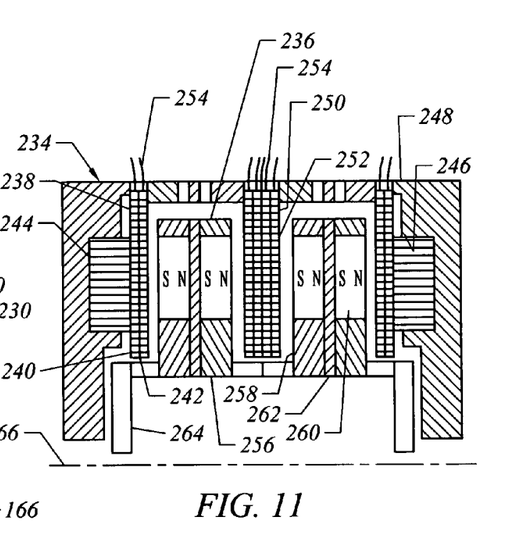
FIG. 11 is a schematic partial cross-sectional illustration of an alternate embodiment of an electrical machine with a conductor assembly having outer conductor sub-assemblies with associated laminated flux return rings.

In FIG. 11, the schematic illustration of a further alternate embodiment of the electrical machine 234 depicts a centrally located magnet assembly 236 with a conductor assembly 238 having end sub-assemblies 240 with a stationary form wound conductor ring 242 coupled to a laminated spiral wound flux return ring 244 seated in a recess 246 in the stator housing 248.

The conductor assembly 238 also includes central conductor sub-assemblies 250 with back-to-back form wound conductor rings 252 that are bonded or fabricated together to form a unitary structure. The conductor rings 242 and 252 are supported at their outer periphery in the housing 248 with terminals 254 connected to a controller or other input or output device.

The centrally located magnet assembly 236 includes magnet sub-assemblies 256 with magnet carrier rings 258 having a series of permanent magnets 260 arranged in back-to-back pairings separated by magnet spacer rings 262.

The magnet carrier rings 258 are supported on their inner periphery on a hub structure 264 for rotation as a unit around the central axis 166.

The electrical machine 234 has a lower inertia with fast acceleration and deceleration and has particular application for robotics, servo motors, machine tools and other such applications.

It is to be understood that other arrangements of the essential components may be made and the foregoing is not intended to limit the scope of the invention. Frequently, the particular application will determine the preferred embodiment of the invented electrical machine.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

The invention claimed is:

1. An axial field electrical machine comprising:
   a supporting structure;
   a magnet assembly; and,
   a conductor assembly spaced from the magnet assembly, wherein at least one of the magnet assembly and conductor assembly is rotatable on an axis relative to the supporting structure, wherein the conductor assembly has a disk-like support form with opposite sides and has a flat annular conductor in a double-helix wave winding that has a series of uniform conductor segments on each side of the support that are formed in a continuous uniform curve with one of an involute shape and arc shape, and wherein the magnet assembly has at least one permanent magnet positioned on the magnet assembly to generate a magnetic field substantially parallel to the rotation axis and directed at a portion of the wave winding and substantially centered on the central part of the conductor segments wherein the annular wave winding and support form have substantially coincident axes with the axis of rotation and wherein the conductor segments at the central part have a midpoint tangent that is at a significant angle from a radial of the rotation axis that is normal to the radial.

2. The axial field electrical machine of claim 1, wherein the curved conductor segments on each side of the support form have a midpoint tangent at the central part of the curved conductor segments that forms an angle in the range of 30° to 80° from a radial of the rotation axis that is normal to the radial.

3. The axial field electrical machine of claim 1, wherein the curved conductor segments on each side of the support form have a midpoint tangent that forms an angle approximately 45° from the radial of the rotation axis.

4. The axial field electrical machine of claim 1, wherein the conductor in the double helix wave winding is divided into at least two circuits with each circuit being approximately 180° out of phase with one another.

5. The axial field electrical machine of claim 1, wherein the conductor in the double helix wave winding is divided into at least six circuits with each circuit being approximately 60° out of phase from one another.

6. The axial field electrical machine of claim 1, wherein the magnet assembly has a magnet carrier with a plurality of permanent magnets uniformly positioned on the magnet carrier to generate magnetic fields substantially parallel to rotation axis directed at portions of the wave winding.

7. The axial field electrical machine of claim 6, wherein the plurality of permanent magnets are of an even number, uniformly spaced around a circular locus with adjacent magnets having opposite poles directed at portions of the wave winding.

8. The axial field electrical machine of claim 1, wherein the magnet assembly has first and second magnet sub-assemblies, each magnet sub-assembly having a non-magnetic magnet carrier located on each side of the disk-like support form of the conductor assembly with an even plurality of permanent magnets uniformly positioned on each magnet carrier on a circular locus with alternating poles with magnets on opposing carriers on each side of the support form being aligned with opposing fields directed at portions of the wave winding.

9. The axial field electrical machine of claim 1, wherein the disk-like support form of the conductor assembly is a flat ring and includes inner and outer notches with curved conductor grooves and insulator ridges separating the conductor grooves wherein the conductor comprises an electricity conducting wire located in the grooves and helically wrapped around the ring in the inner and outer notches.

10. The axial field electrical machine of claim 9, wherein the conductor ring with installed wire is fabricated into a structurally strong unit with the conductor windings crossing on opposite sides of the support form providing structural reinforcement.

11. An axial field electrical machine comprising:
    a housing structure;
    a magnet assembly having first and second magnet sub-assemblies; and,
    a conductor assembly having a conductor sub-assembly, the housing structure includes end plates and peripheral side walls that encase the magnet assembly and conductor assembly, and the conductor assembly has a conductor wave winding fabricated in a flat annular discoid form with at least one conductor wound in a double helical flat ring wrap having opposite sides with a series of adjacent conductor segments on each side of the wrap having a continuous uniform curve in the form of one of an arc and an involute wherein the adjacent conductor segments on each side of the wrap have a central part, and, wherein the first and second magnet sub-assemblies each have an even number of permanent magnets and are located on each side of the ring wrap with permanent magnets positioned to direct a magnetic field centered at the central part of the conductor segments when one of the magnet assembly and conductor assembly rotates in the housing structure on an axis, wherein the conductor segments at the central part have a midpoint tangent that is at a significant angle from a radial of the rotation axis that is normal to the radial.

12. The axial field electrical machine of claim 11 wherein the magnet assembly rotates and the conductor assembly is a stator mounted in the housing structure.

13. The axial field electrical machine of claim 12 wherein the helical flat ring wrap has an inner diameter and outer diameter displaced from the axis on which the magnet assembly rotates wherein the permanent magnets are flat with a perimeter sized to generate an axial flux field across a circumferential sector of the ring wrap between the inner diameter and the outer diameter.

14. The axial field electrical machine of claim 13 wherein the first and second magnet sub-assemblies have a magnet carrier of non-magnetic material that carries a series of permanent magnets of alternating poles in sectors around a circumference with the magnets directed at the ring wrap across a narrow air gap.

15. The axial field electrical machine of claim 13 wherein the magnet assembly rotates and has a perimeter with a magnetizable retainer band.

16. The axial field electrical machine of claim 13 wherein the flat permanent magnets are one of a circular shape, square shape, diamond shape and sector shape.

17. The axial field electrical machine of claim 13 wherein the ring wrap is fabricated of a dielectric material into a structural ring with a mounting edge and is mounted in the housing by its mounting edge.

18. The axial field electrical machine of claim 14 wherein the magnet carriers are interconnected and each carrier is coupled to a magnetizable end plate having a shaft wherein the end plates of the housing have bearings and the shafts of the end plates of the magnet carriers engage the bearings for rotation of the sub-assemblies as a unit.

19. The axial field electrical machine of claim 18 wherein the magnet assembly has additional magnet sub-assemblies between the first and second magnet sub-assemblies wherein the additional magnet sub-assemblies have paired magnet carriers separated by a thin plate, the magnet carriers including the magnet carriers coupled to the end plates having cut-outs sized to accommodate the shape of the permanent magnets and having perimeters with a retaining band, and wherein the conductor assembly has multiple conductor sub-assemblies with individual magnet sub-assemblies being located between adjacent paired magnet carriers and between magnet carriers with end plates and adjacent paired magnet carriers.

20. The axial field electrical machine of claim 19 wherein the housing structure has magnetically filtered air intake ports in the end plates and air exit slots in the side walls, and wherein the permanent magnet carriers are in the form of a ring having an inner perimeter around an inner chamber with air scoops at the inner perimeter wherein air is conveyed to the inner chamber from the intake ports in the end plates, across the permanent magnets on the carrier rings and out the exit slots to cool the magnets.

* * * * *